(12) United States Patent
Ikeyama

(10) Patent No.: US 9,168,472 B2
(45) Date of Patent: Oct. 27, 2015

(54) AIR-PERMEABLE FILM IMPARTED WITH OIL REPELLENCY

(71) Applicant: NITTO DENKO CORPORATION, Ibaraki-shi, Osaka (JP)

(72) Inventor: Yoshiki Ikeyama, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 14/390,572

(22) PCT Filed: Apr. 2, 2013

(86) PCT No.: PCT/JP2013/002289
§ 371 (c)(1),
(2) Date: Oct. 3, 2014

(87) PCT Pub. No.: WO2013/150780
PCT Pub. Date: Oct. 10, 2013

(65) Prior Publication Data
US 2015/0089911 A1 Apr. 2, 2015

(30) Foreign Application Priority Data

Apr. 6, 2012 (JP) ................................ 2012-087047

(51) Int. Cl.
| | | |
|---|---|---|
| B01D 53/22 | (2006.01) | |
| B01D 39/16 | (2006.01) | |
| C08J 7/06 | (2006.01) | |
| B01D 67/00 | (2006.01) | |
| B01D 69/12 | (2006.01) | |

(52) U.S. Cl.
CPC ............ B01D 39/1661 (2013.01); C08J 7/065 (2013.01); B01D 53/22 (2013.01); B01D 53/228 (2013.01); B01D 67/0002 (2013.01); B01D 67/0004 (2013.01); B01D 69/12 (2013.01)

(58) Field of Classification Search
CPC .. B01D 39/1661; B01D 53/22; B01D 53/228; B01D 67/0002; B01D 67/0004; B01D 69/12
See application file for complete search history.

(56) References Cited

U.S. PATENT DOCUMENTS

| | | | | | |
|---|---|---|---|---|---|
| 3,236,672 A | * | 2/1966 | Shane et al. | ................ | 106/287.2 |
| 3,256,230 A | * | 6/1966 | Johnson, Jr. et al. | ....... | 427/393.4 |
| 3,256,231 A | * | 6/1966 | Johnson, Jr. et al. | ......... | 524/805 |
| 3,419,602 A | * | 12/1968 | Pittman et al. | ................ | 560/223 |
| 3,524,760 A | * | 8/1970 | Pinkerton | ..................... | 427/335 |
| 3,585,169 A | * | 6/1971 | Domba | ......................... | 526/248 |
| 3,637,791 A | * | 1/1972 | Pittman | .......................... | 558/54 |
| 3,823,171 A | * | 7/1974 | Pittman | .......................... | 554/151 |
| 5,021,501 A | * | 6/1991 | Ohmori et al. | ................ | 524/544 |
| 5,021,527 A | * | 6/1991 | Ohmori et al. | ................ | 526/245 |
| 5,346,949 A | * | 9/1994 | Fukazawa | ..................... | 524/805 |
| 5,462,586 A | | 10/1995 | Sugiyama et al. | | |
| 5,584,997 A | * | 12/1996 | Yagihashi et al. | ........ | 210/321.79 |
| 5,630,846 A | * | 5/1997 | Hara et al. | ..................... | 8/127.1 |
| 5,804,074 A | * | 9/1998 | Takiguchi et al. | ........ | 210/497.01 |
| 5,879,794 A | * | 3/1999 | Korleski, Jr. | ................ | 428/317.1 |
| 6,302,934 B1 | * | 10/2001 | Nabata et al. | .................... | 55/486 |
| 6,890,436 B2 | * | 5/2005 | Komatsu et al. | .......... | 210/500.41 |
| 6,939,580 B2 | * | 9/2005 | Enomoto et al. | .............. | 427/354 |
| 6,994,621 B2 | * | 2/2006 | Mashiko et al. | .............. | 454/270 |
| 7,277,153 B2 | * | 10/2007 | Iida et al. | ....................... | 349/187 |
| 7,678,155 B2 | * | 3/2010 | Yamamoto et al. | ............ | 8/115.6 |
| 7,758,656 B2 | * | 7/2010 | Enomoto et al. | ............... | 8/115.6 |
| 7,954,944 B2 | * | 6/2011 | Abe et al. | .................. | 351/159.57 |
| 8,079,574 B2 | * | 12/2011 | Lin | ............................... | 261/104 |
| 8,524,644 B2 | * | 9/2013 | Kawata et al. | ................ | 508/459 |
| 8,680,223 B2 | * | 3/2014 | Jin et al. | ........................ | 526/245 |
| 8,747,521 B2 | * | 6/2014 | Sano | ................................. | 95/47 |
| 2003/0106161 A1 | * | 6/2003 | Enomoto et al. | .............. | 8/115.51 |
| 2004/0122464 A1 | * | 6/2004 | Wang et al. | .................... | 606/194 |
| 2005/0001974 A1 | * | 1/2005 | Iida et al. | ....................... | 349/187 |
| 2005/0175811 A1 | * | 8/2005 | Kubota et al. | ................... | 428/96 |
| 2008/0081772 A1 | * | 4/2008 | Kawata | ........................... | 508/100 |
| 2008/0274920 A1 | * | 11/2008 | Negoro et al. | ................ | 508/258 |
| 2009/0143262 A1 | * | 6/2009 | Kawata | ........................... | 508/256 |
| 2009/0188857 A1 | * | 7/2009 | Moore et al. | ............. | 210/500.34 |
| 2010/0143641 A1 | * | 6/2010 | Yamamoto et al. | .............. | 428/96 |
| 2010/0224817 A1 | * | 9/2010 | Jin et al. | ........................ | 252/8.62 |
| 2010/0316835 A1 | * | 12/2010 | Nakamura et al. | .............. | 428/96 |
| 2011/0020591 A1 | * | 1/2011 | Nakamura et al. | .............. | 428/96 |
| 2011/0021099 A1 | * | 1/2011 | Nakamura et al. | .............. | 442/80 |
| 2011/0028059 A1 | * | 2/2011 | Nakamura et al. | .............. | 442/80 |
| 2011/0230623 A1 | * | 9/2011 | Hirano et al. | ................. | 525/309 |
| 2012/0171495 A1 | * | 7/2012 | Masuda et al. | ................ | 428/421 |
| 2012/0285645 A1 | * | 11/2012 | Kusumi et al. | ............. | 162/164.7 |
| 2012/0325419 A1 | * | 12/2012 | Uehara et al. | ................... | 162/135 |
| 2013/0014642 A1 | * | 1/2013 | Sano | .................................. | 95/45 |
| 2013/0283744 A1 | * | 10/2013 | Nakamura et al. | .............. | 55/524 |
| 2014/0023895 A1 | | 1/2014 | Ikeyama et al. | | |
| 2014/0260986 A1 | * | 9/2014 | Ishizuka et al. | .................... | 96/13 |
| 2015/0096699 A1 | * | 4/2015 | Uehara et al. | .............. | 162/168.5 |

FOREIGN PATENT DOCUMENTS

| | | |
|---|---|---|
| JP | 4-506982 | 12/1992 |
| JP | 06-073229 | 3/1994 |

(Continued)

OTHER PUBLICATIONS

Kashiwagi et al., Machine Translation of JP 2009-242679, Oct. 22, 2009.*

(Continued)

Primary Examiner — Jason M Greene
Assistant Examiner — Anthony Shumate
(74) Attorney, Agent, or Firm — Hamre, Schumann, Mueller & Larson, P.C.

(57) ABSTRACT

Disclosed is an air-permeable film imparted with oil repellency, including a porous body having a surface coated with an oil-repellent agent. The oil-repellent agent contains a linear fluorine-containing hydrocarbon group represented by —$R^1C_5F_{10}CH_2C_4F_9$ or —$R^2C_6F_{13}$, where $R^1$ and $R^2$ are each independently an alkylene group having 1 to 12 carbon atoms or a phenylene group, and the porous body is a porous formed body composed of ultra-high molecular weight polyethylene fine particles that are bound together. This air-permeable film is imparted with oil repellency without significantly reducing its air permeability.

4 Claims, No Drawings

(56) References Cited

FOREIGN PATENT DOCUMENTS

| | | |
|---|---|---|
| JP | 7-048464 | 2/1995 |
| JP | 7-126428 | 5/1995 |
| JP | 09-022935 | 1/1997 |
| JP | 09-103662 | 4/1997 |
| JP | 2004-237142 | 8/2004 |
| JP | 2005-253711 | 9/2005 |
| JP | 2009-242679 | 10/2009 |
| WO | WO 91/01791 | 2/1991 |
| WO | WO 2008/041750 | 4/2008 |
| WO | WO 2012/086606 | 6/2012 |
| WO | WO 2012/117709 | 9/2012 |

OTHER PUBLICATIONS

Harada et al., Machine Translation of JP 09-103662, Apr. 22, 1997*

* cited by examiner

AIR-PERMEABLE FILM IMPARTED WITH OIL REPELLENCY

TECHNICAL FIELD

The present invention relates to an air-permeable film imparted with oil repellency.

BACKGROUND ART

Porous formed bodies composed of ultra-high molecular weight polyethylene fine particles that are bound together (hereinafter sometimes referred to as "porous bodies of ultra-high molecular weight polyethylene") are widely used as air-permeable films in various applications due to their excellent properties such as air permeability, low friction coefficient, and abrasion resistance. For example, Patent Literature 1 shows a sheet for suction holding as an example of such applications, and Patent Literature 2 shows, as another example of the applications, a tip filter adapted to be attached to the tip portion of a suction nozzle of a liquid suction device.

The air-permeable films described above are attached to various products (hereinafter also referred to as "workpieces"). An adhesive layer is provided on a part of the top or bottom surface of the air-permeable film, and the air-permeable film is placed on a workpiece such that the adhesive layer is in contact with the workpiece. Then, the interior of the workpiece is evacuated through a vent hole of the workpiece (formed on the opposite side of the workpiece from the air-permeable film placed thereon) so as to suck and hold the air-permeable film. This attachment technique has not only an advantage that it is easier to place the porous body of ultra-high molecular weight polyethylene but also an advantage that the air-permeable film is less likely to be displaced from the position where it is placed. The adhesive layer is preferably made of a pressure-sensitive adhesive because it can be easily removed to replace the air-permeable film by a new one, but instead, a hot-melt adhesive, a thermosetting adhesive, a tackiness agent, or the like may be used.

CITATION LIST

Patent Literature

Patent Literature 1: JP 2004-237142 A
Patent Literature 2: JP H09(1997)-022935 A

SUMMARY OF INVENTION

Technical Problem

When the air-permeable film is used as a sheet for suction holding as described above, oil on a base, an adhesive, or a tackiness agent may penetrate the air-permeable film in its thickness direction and seep to the surface of the air-permeable film in contact with a workpiece. When the air-permeable film is used as a tip filter, it is subjected to antistatic treatment. This antistatic treatment also imparts hydrophilicity to the air-permeable film, which may cause a decrease in its water resistance. As described above, the air-permeable film is readily permeable to liquids, such as oil, having low surface tension. Therefore, the air-permeable film is subjected to oil-repellent treatment using a treating agent containing a fluorine-containing polymer, suitable for its intended use.

It is well known that a fluorine-containing polymer having a linear perfluoroalkyl group (hereinafter, a "linear perfluoroalkyl group" may be referred to as an "Rf group") having 8 or more carbon atoms is suitable for imparting oil repellency. Rf groups having 8 or more carbon atoms have a significantly higher crystallinity than Rf groups having a smaller number of (for example, 6 or less) carbon atoms. This high crystallinity is considered to contribute to the development of excellent oil repellency. It is also known that, due to its high crystallinity, a treating agent having an Rf group having 8 or more carbon atoms exhibits a large receding contact angle, (which is one of the dynamic contact angles and the other of which is an advancing contact angle). The receding contact angle increases with increasing crystallinity, and sharply increases as the number of carbon atoms increases from 6 to 8. For these reasons, it is common practice to use a treating agent containing a fluorine-containing polymer having an Rf group having 8 or more carbon atoms to impart oil repellency to an air-permeable film.

However, in some cases where an air-permeable film is subjected to oil-repellent treatment with a treating agent containing a fluorine-containing polymer having an Rf group having 8 or more carbon atoms, the air permeability of the air-permeable film decreases significantly. The degree of the decrease in the air permeability depends on the porous structure of the air-permeable film. In the case of a porous body of ultra-high molecular weight polyethylene having a distinctive microporous structure composed of ultra-high molecular weight polyethylene fine particles that are bound together, the air permeability may remarkably decrease as a result of oil-repellent treatment using the above treating agent.

In view of the above circumstances, it is an object of the present invention to impart oil repellency to an air-permeable film formed of a porous formed body composed of ultra-high molecular weight polyethylene fine particles that are bound together, without significantly reducing its air permeability.

Solution to Problem

The present invention provides an air-permeable film imparted with oil repellency, including a porous body having a surface coated with an oil-repellent agent. The oil-repellent agent contains a linear fluorine-containing hydrocarbon group represented by:

  (1)

or

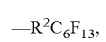  (2)

where $R^1$ and $R^2$ are each independently an alkylene group having 1 to 12 carbon atoms or a phenylene group, and the porous body is a porous formed body composed of ultra-high molecular weight polyethylene fine particles that are bound together.

Advantageous Effects of Invention

The oil-repellent agent having a linear fluorine-containing hydrocarbon group represented by 1) or 2) can impart oil repellency enough to meet practical requirements to an air-permeable film formed of a porous formed body composed of ultra-high molecular weight polyethylene fine particles that are bound together, without significantly reducing its air permeability. According to the present invention, it is possible to impart oil repellency to an air-permeable film formed of a porous formed body composed of ultra-high molecular weight polyethylene fine particles that are bound together, without significantly reducing its air permeability.

DESCRIPTION OF EMBODIMENTS

An air-permeable film according to the present invention includes a porous formed body that has a surface coated with an oil-repellent agent and that is composed of ultra-high molecular weight polyethylene fine particles that are bound together. As the porous body of ultra-high molecular weight polyethylene, a commercially available product may be used. Instead, an original porous body may be prepared for use. An example of the method for preparing such a porous body is described below.

First, ultra-high molecular weight polyethylene fine particles having an average particle diameter of 30 μm to 200 μm are placed in a mold. As used herein, the "ultra-high molecular weight polyethylene fine particles" refer to a powder of polyethylene having a molecular weight (of about 500000 or more), which is more than about 5 times the molecular weight (of about 100000 or less) of ordinary polyethylene. Examples of the commercially available ultra-high molecular weight polyethylene fine particles include "HI-ZEX MILLION" manufactured by Mitsui Petrochemical Industries, Ltd. and "Hostalen GUR" manufactured by Hoechst AG. As the average particle diameter of the above ultra-high molecular weight polyethylene fine particles increases, the pore diameter of the pores of the air-permeable film to be prepared increases and thus the porosity of the resulting air-permeable film increases.

Next, heated steam is introduced into the mold through its opening and then the heated steam is further heated to a temperature equal to or higher than the melting point of ultra-high molecular weight polyethylene so as to sinter the ultra-high molecular weight polyethylene fine particles. By this sintering, the ultra-high molecular weight polyethylene fine particles are heated to a temperature equal to or higher than their melting point, but they are not liquefied or fluidized due to their high melt viscosity. Rather, only the contact points of adjacent fine particles are thermally fused together and the shape of the fine particles is partly or mostly maintained. The ultra-high molecular weight polyethylene fine particles are bound together in this manner and pores are formed in the non-contact portions between the particles. Thus, a block-shaped porous formed body can be obtained.

During the sintering process, the temperature of the steam is raised and the steam is in a compressed state. Therefore, the steam readily penetrates into the spaces between the ultra-high molecular weight polyethylene fine particles and thus sintering proceeds relatively efficiently. In order to further increase the sintering efficiency, the mold may be placed in a pressure resistant container to reduce the pressure in the mold before the steam is introduced into the mold. By reducing the pressure, the steam penetrates into the spaces between the ultra-high molecular weight polyethylene fine particles more readily. The pressure in the mold is reduced by evacuating the mold through a steam inlet pipe of the pressure resistant container. For the order of the evacuation step and the heated steam introduction step, it is preferable to introduce the heated steam into the mold after the mold is evacuated, but the heated steam may be introduced into the mold while evacuating the mold. The degree of pressure reduction is not particularly limited, but it is preferable to reduce the pressure to about 1 to 100 mmHg. The time required for the sintering is appropriately selected depending of the amount of the powder in the mold, the temperature of the steam, etc., and it is usually about 1 to 12 hours. During the sintering process, pressure may be applied to the ultra-high molecular weight polyethylene fine particles. By applying pressure to the ultra-high molecular weight polyethylene fine particles and by increasing the pressure applied, the pore diameter of the pores of the air-permeable film to be prepared is reduced and the porosity thereof is reduced accordingly. The pressure applied is preferably about 10 kg/cm$^2$ or less.

Next, the block-shaped formed body thus prepared is cooled. The block-shaped formed body may be cooled in the mold or may be cooled alone after being removed from the mold. From the viewpoint of preventing cracks from occurring in the block-shaped formed body, it is preferable to avoid rapid cooling. For example, it is preferable to allow the formed body to cool at room temperature. Then, after the cooling, the block-shaped formed body is cut to a predetermined thickness using a lathe or the like. Thus, an air-permeable film can be obtained.

The air-permeable film of the present invention may be subjected to antistatic treatment. With this antistatic treatment, it is possible to prevent sparking caused by static electricity accumulated in the air-permeable film from occurring in a semiconductor wafer dicing step and thus to prevent damage of the wafer caused by sparking. It is also possible to prevent dust from adhering to a workpiece such as a semiconductor wafer. The method for applying the antistatic treatment is not particularly limited and a conventional method can be used. For example, an antistatic agent may be added to the ultra-high molecular weight polyethylene fine particles to sinter the resulting mixture, or the air-permeable film may be brought into contact with a solution containing an antistatic agent (the contact includes immersion, coating, etc.).

The content of the antistatic agent in the air-permeable film is not particularly limited. Preferably, in the usual case, the content of the antistatic agent is 0.1 wt. % to 2 wt. % with respect to the total weight of the air-permeable film. Commercially available antistatic agents such as "ELECNON OR-W" (manufactured by New Fine Chemical Co., Ltd.) and "ELECTROSTRIPPER" (manufactured by Kao Corporation) can be used. Inorganic conductive materials such as carbon black powder and metal powder also can be used.

The air-permeable film of the present invention is usually white and opaque. However, the air-permeable film is preferably colored for use in machining a glass plate for liquid crystal displays. In the step of scribing the glass plate for liquid crystal displays, white scribed lines may be provided in the glass plate. The whiteness of the scribed lines stands out in the colored air-permeable film, and machining defects are easily visible. As used herein, the machining defects refer to, for example, an unexpected scribing depth and a scribed line formed in an unexpected region. In the case of a white air-permeable film, the white scribed lines are not distinguished from the white air-permeable film, and the scribed lines are less visible and machining defects may be overlooked.

The average pore diameter of the porous body of ultra-high molecular weight polyethylene is preferably 1 μm to 500 μm, more preferably 1 μm to 100 μm, and particularly preferably 5 μm to 50 μm. When the average pore diameter is too small, the air permeability of the air-permeable film may decrease. When the average pore diameter is too large, foreign matters may leak. The thickness of the porous body of ultra-high molecular weight polyethylene is preferably 0.01 mm to 10 mm, more preferably 0.05 mm to 5 mm, and particularly preferably 0.1 mm to 3 mm. When the thickness is too small, there is a risk that the strength of the body is insufficient or the air-permeable film is deformed too much due to a differential pressure between the interior and exterior of a vent housing. When the thickness is too large, the air permeability of the air-permeable film may decrease.

In the present invention, an oil-repellent agent having a linear fluorine-containing hydrocarbon group represented by:

$$—R^1C_5F_{10}CH_2C_4F_9; \quad\quad 1)$$

or $$—R^2C_6F_{13} \quad\quad 2)$$

is used. Here, $R^1$ and $R^2$ are each independently an alkylene group having 1 to 12 carbon atoms or preferably 1 to 10 carbon atoms, or a phenylene group. The fluorine-containing hydrocarbon group represented by 1) or 2) is a linear fluoroalkyl group when $R^1$ or $R^2$ is an alkylene group. The term "linear" is intended to make it clear that the carbon skeleton of the fluorine-containing hydrocarbon group does not have two or more branched terminals, and is not intended to exclude the case where a phenylene group is contained as $R^1$ or $R^2$.

A linear perfluoroalkyl group (Rf group) is a functional group that has a $CF_3$ group exhibiting a low surface free energy and that imparts water/oil repellency to a coated surface. As described above, it is known that an Rf group having 8 or more carbon atoms has high crystallinity, and thus allows excellent oil repellency to develop. A treating agent containing a fluorine-containing polymer having an Rf group having 8 or more carbon atoms is suitable for imparting water/oil repellency to a substrate made of leather, paper, resin, or the like. However, when the treating agent is used for an air-permeable film having a microporous structure, such as an air-permeable film formed of a porous formed body composed of ultra-high molecular weight polyethylene fine particles that are bound together, the air permeability may decrease significantly. The water/oil repellency imparted by this treating agent is useful particularly for applications that require large dynamic contact angles. However, it is generally sufficient that oil repellency enough to block penetration of hydrocarbons such as toluene and decane and of lower alcohols as typified by IPA can be imparted to an air-permeable film. When a surface of the air-permeable film is coated with the oil-repellent agent having the linear fluorine-containing hydrocarbon group represented by 1) or 2), practically sufficient oil repellency can be imparted to the film without significantly reducing the air-permeability.

The oil-repellent agent is preferably a fluorine-containing polymer having a linear fluorine-containing hydrocarbon group as a side chain. In this fluorine-containing polymer, for example, the linear fluorine-containing hydrocarbon group is bonded to the main chain directly or via a functional group such as an ester group or an ether group.

Examples of the fluorine-containing polymer having the linear fluorine-containing hydrocarbon group represented by 1) or 2) include a polymer formed from monomers at least a part of which is a compound represented by:

$$CH_2=CR^3COOR^1C_5F_{10}CH_2C_4F_9; \quad\quad a)$$

or $$CH_2=CR^4COOR^2C_6F_{13} \quad\quad b)$$

Here, $R^1$ and $R^2$ are as described above. In addition, $R^3$ and $R^4$ are each independently a hydrogen atom or a methyl group.

In the case where high oil repellency is required, a compound represented by a), or a compound represented by b) where $R^4$ is a methyl group, is preferably selected as a part of monomers. That is, in a preferred embodiment of the present invention, a polymer formed from monomers represented by:

$$CH_2=CR^3COOR^1C_5F_{10}CH_2C_4F_9; \quad\quad a)$$

or $$CH_2=C(CH_3)COOR^2C_6F_{13} \quad\quad b)$$

is used. Also here, $R^1$, $R^2$, and $R^3$ are as described above.

This fluorine-containing polymer may be formed by polymerizing only the compound(s) represented by a) and/or b) as monomers, but may be formed by copolymerizing the compound(s) with other monomers. Examples of the other monomers for copolymerization include various (meth)acrylic monomers. However, the other monomers are not limited to (meth)acrylic monomers. Any of various monomers having ethylenically unsaturated bonds, such as tetrafluoroethylene, may be used. The copolymer may be a random copolymer or a block copolymer. When the fluorine-containing polymer is a copolymer, the ratio of the compound represented by a) or b) in all monomers is preferably 60 mol % or more, and particularly preferably 90 mol % or more in order not to affect imparting of oil repellency. The polymerization of the compound can be performed according to a commonly-known method for polymerizing acrylic monomers, and can be carried out by solution polymerization or emulsion polymerization.

The average molecular weight of the fluorine-containing polymer is not particularly limited, and is, for example, about 1000 to 500000 in terms of the number average molecular weight.

Examples of the method for coating the surface of the air-permeable film with the oil-repellent agent include a method in which the air-permeable film is immersed into a solution prepared by dissolving the oil-repellent agent in a dissolving liquid, and a method in which the solution is applied or sprayed onto the air-permeable film. The appropriate concentration of the oil-repellent agent in the solution varies depending on the method for coating, and is about 0.1% by weight to 10% by weight in the case of the method in which the air-permeable film is immersed into the solution.

When the air permeability of the air-permeable film having been subjected to oil-repellent treatment is too low, the pressure difference between the interior and the exterior of a vent housing cannot be eliminated quickly. The air permeability is preferably 15 seconds/100 ml or less in terms of Gurley number, and more preferably 11 seconds/100 ml or less (the lower the Gurley number is, the higher the air permeability is). As shown in Examples described below, the present invention can provide an air-permeable film that has an air permeability of 15 seconds/100 ml or less in terms of Gurley number and that has a surface having practical oil repellency. The surface has such a degree of oil repellency that a 5 mm-diameter droplet of an organic solvent that is n-decane or methanol does not penetrate the surface within 30 seconds after the droplet is applied onto the surface. The present invention can also provide an air-permeable film that includes a porous body of ultra-high molecular weight polyethylene having a thickness of 0.5 mm or more or even 1 mm or more in order to achieve the strength required for the air-permeable film, and that also has a low Gurley number as described above and has a surface having practical oil repellency.

EXAMPLES

Hereinafter, the present invention will be described in detail with reference to Examples and Comparative Example. However, the present invention is not limited to these Examples.

Example 1

An ultra-high molecular weight polyethylene porous film "SUNMAP LC" (size: 20 cm×20 xm, thickness: 2.0 mm, average pore diameter: 20 μm) manufactured by Nitto Denko Corporation was prepared as an air-permeable film. In addition, a water/oil-repellent treatment liquid was prepared by diluting a water/oil-repellent agent "X-70-041" manufactured by Shin-Etsu Chemical Co., Ltd., with a diluting agent ("FS thinner" manufactured by Shin-Etsu Chemical Co., Ltd.) so that the concentration of the water/oil-repellent agent was 3.0% by weight. The "X-70-041" is a water/oil-repellent agent that includes a polymer formed from monomers including a compound having a linear fluoroalkyl group and represented by the following formula (a-1):

$$CH_2=CHCOOCH_2CH_2C_5F_{10}CH_2C_4F_9 \qquad (a\text{-}1)$$

The air-permeable film was immersed for about 3 seconds in the water/oil-repellent treatment liquid whose temperature was maintained at 20° C. Subsequently, the air-permeable film was left at ordinary temperature for about 1 hour to dry the film. Thus, a water/oil-repellent, air-permeable film was obtained.

Example 2

An air-permeable film was obtained in the same manner as in Example 1, except that a water/oil-repellent agent "X-70-042" manufactured by Shin-Etsu Chemical Co., Ltd., was used. The "X-70-042" is a water/oil-repellent agent that includes a polymer formed from monomers including a compound having a linear fluoroalkyl group and represented by the following formula (a-2):

$$CH2=C(CH_3)COOCH2CH2C5F10CH_2C_4F_9 \qquad (a\text{-}2)$$

Example 3

100 g of a compound having a linear fluoroalkyl group and represented by the formula (b-1) shown below, 0.1 g of azobisisobutyronitrile serving as a polymerization initiator, and 300 g of a solvent ("FS thinner" manufactured by Shin-Etsu Chemical Co., Ltd.) were put into a flask equipped with a nitrogen introducing tube, a thermometer, and a stirrer. Nitrogen gas was introduced while stirring was performed at 70° C., and addition polymerization was thus allowed to proceed for 16 hours. As a result, 80 g of a fluorine-containing polymer was obtained. The number average molecular weight of this polymer was 100000. A water/oil-repellent treatment liquid was prepared by diluting the fluorine-containing polymer with a diluting agent ("FS thinner" manufactured by Shin-Etsu Chemical Co., Ltd.) so that the concentration of the fluorine-containing polymer was 3.0% by weight.

$$CH_2=CHCOOCH_2CH_2C_6F_{13} \qquad (b\text{-}1)$$

An air-permeable film was obtained in the same manner as in Example 1, except that the water/oil-repellent treatment liquid mentioned above was used.

Example 4

100 g of a compound having a linear fluoroalkyl group and represented by the formula (b-2) shown below, 0.1 g of azobisisobutyronitrile serving as a polymerization initiator, and 300 g of a solvent ("FS thinner" manufactured by Shin-Etsu Chemical Co., Ltd.) were put into a flask equipped with a nitrogen introducing tube, a thermometer, and a stirrer. Nitrogen gas was introduced while stirring was performed at 70° C., and addition polymerization was thus allowed to proceed for 16 hours. As a result, 80 g of a fluorine-containing polymer was obtained. The number average molecular weight of this polymer was 100000. A water/oil-repellent treatment liquid was prepared by diluting the fluorine-containing polymer with a diluting agent ("FS thinner" manufactured by Shin-Etsu Chemical Co., Ltd.) so that the concentration of the fluorine-containing polymer was 3.0% by weight.

$$CH_2=C(CH_3)COOCH_2CH_2C_6F_{13} \qquad (b\text{-}2)$$

An air-permeable film was obtained in the same manner as in Example 1, except that the water/oil-repellent treatment liquid mentioned above was used.

Comparative Example 1

100 g of a compound having a linear fluoroalkyl group and represented by the formula (c) shown below, 0.1 g of azobisisobutyronitrile serving as a polymerization initiator, and 300 g of a solvent ("FS thinner" manufactured by Shin-Etsu Chemical Co., Ltd.) were put into a flask equipped with a nitrogen introducing tube, a thermometer, and a stirrer. Nitrogen gas was introduced while stirring was performed at 70° C., and addition polymerization was thus allowed to proceed for 16 hours. As a result, 80 g of a fluorine-containing polymer was obtained. The number average molecular weight of this polymer was 100000. A water/oil-repellent treatment liquid was prepared by diluting the fluorine-containing polymer with a diluting agent ("FS thinner" manufactured by Shin-Etsu Chemical Co., Ltd.) so that the concentration of the fluorine-containing polymer was 3.0% by weight.

$$CH_2=C(CH_3)COOCH_2CH_2C_8F_{17} \qquad (c)$$

An air-permeable film was obtained in the same manner as in Example 1, except that the water/oil-repellent treatment liquid mentioned above was used.

<Evaluation Results>

Air permeability test, oil repellency test, and water repellency test were carried out for the air-permeable films having been subjected to water/oil-repellent treatment in Examples and Comparative Example 1, and for an air-permeable film not having been subjected to water/oil-repellent treatment (that is, an untreated product of "SUNMAP LC"). The air permeability test was carried out by the air permeability measurement method, B method (Gurley test method) specified in JIS L 1096. In the Gurley test method, the lower the air permeability property is, the higher the Gurley number is. This means that the lower the Gurley number is, the higher the air permeability is.

The oil repellency test was carried out in accordance with "textiles-oil repellency-hydrocarbon resistance test" specified in ISO 14419. Specifically, a droplet of an organic solvent having a diameter of about 5 mm was applied onto a surface of each air-permeable film using a pipette, and whether or not penetration of the droplet occurred within 30 seconds after application of the droplet was visually observed. As the organic solvents, n-decane and methanol were used.

For the penetration of the droplet, it was determined that "penetration occurred" when the droplet was absorbed into the air-permeable film or when the color of the air-permeable film changed due to the penetration of the droplet. The water repellency test was carried out by the same test method as the oil repellency test, except that water was used instead of the organic solvents used for the oil repellency test. Table 1 shows the respective evaluation results.

TABLE 1

| | Water/oil repellency test | | | Gurley number |
|---|---|---|---|---|
| | n-decane | methanol | water | (seconds/100 ml) |
| Untreated product | x | x | ○ | 8 |
| Example 1 | ○ | ○ | ○ | 10 |
| Example 2 | ○ | ○ | ○ | 11 |
| Example 3 | ○ | ○ | ○ | 9 |
| Example 4 | ○ | ○ | ○ | 10 |
| Com. Example 1 | ○ | ○ | ○ | 17 |

○: Penetration did not occur
x: Penetration occurred

The Gurley number of the film of Comparative Example 1 was more than twice that of the untreated product. This revealed that although the oil-repellent treatment using a linear perfluoroalkyl group (Rf group) having 8 or more carbon atoms is advantageous in exhibiting oil repellency, the oil-repellent treatment hinders the maintenance of the air permeability of a microporous structure as formed in the porous body of ultra-high molecular weight polyethylene. In contrast, in Examples 1 to 4, the Gurley number was higher than that of the untreated product but the difference between them was only 1.4 times or less.

The results of the "water/oil repellency test" in Table 1 reveal that the air-permeable films of Examples 1 to 4 each have oil repellency enough to block penetration of n-decane (surface tension: 23.83 dyn·cm$^{-1}$) and methanol (surface tension: 22.45 dyn·cm$^{-1}$). It can be said that the levels of the oil repellency of Examples 1 to 4 are quite comparable to that of Comparative Example 1. Such a surface that blocks penetration of these organic solvents can meet practical requirements for the properties needed for use as an air-permeable film.

The above results are summarized as follows. The air-permeable films of the present invention (Examples 1 to 4) have oil repellency enough to meet practical requirements, without significantly reducing their air permeability. Thus, the effect of the present invention was confirmed.

The invention claimed is:

1. An air-permeable film imparted with oil repellency, comprising:
    a porous body having a surface coated with an oil-repellent agent,
    wherein the oil-repellent agent comprises a linear fluorine-containing hydrocarbon group represented by —R$^1$C$_5$F$_{10}$CH$_2$C$_4$F$_9$, where R$^1$ is an alkylene group having 1 to 12 carbon atoms or a phenylene group,
    the porous body is a porous formed body composed of ultra-high molecular weight polyethylene fine particles that are bound together,
    the air-permeable film has an air permeability of 15 seconds/100 ml or less in terms of Gurley number, and
    a 5 mm-diameter droplet of an organic solvent that is n-decane or methanol does not penetrate the surface within 30 seconds after the droplet is applied onto the surface.

2. The air-permeable film according to claim 1, wherein the oil-repellent agent is a polymer formed from monomers at least a part of which is a compound represented by:

CH$_2$=CR$^3$COOR$^1$C$_5$F$_{10}$CH$_2$C$_4$F$_9$, where R$^3$ is a hydrogen atom or a methyl group.

3. The air-permeable film according to claim 1, wherein the porous formed body has an average pore diameter of 1 μm to 500 μm.

4. The air-permeable film according to claim 1, wherein the porous formed body has a thickness of 0.01 mm to 10 mm.

* * * * *